United States Patent [19]

Lvovsky et al.

[11] Patent Number: 4,620,310
[45] Date of Patent: Oct. 28, 1986

[54] METHOD AND APPARATUS FOR GENERATING BIPOLAR PULSES IN A LOCAL AREA NETWORK

[75] Inventors: Lazar Lvovsky, Walnut Creek; V. Bruce Hunt, Menlo Park, both of Calif.

[73] Assignee: Metapath Inc., Foster City, Calif.

[21] Appl. No.: 710,491

[22] Filed: Mar. 11, 1985

[51] Int. Cl.$^4$ .......................... H03L 3/18; H04B 25/49
[52] U.S. Cl. ........................................ 375/17; 307/270; 307/473; 375/36
[58] Field of Search .............................. 375/17, 36, 59; 330/118, 122, 192, 262, 263, 264, 269, 275; 307/270, 473

[56] References Cited

U.S. PATENT DOCUMENTS

| | | | |
|---|---|---|---|
| 4,047,055 | 9/1977 | Romano | 307/270 |
| 4,118,791 | 10/1978 | Swain | 375/17 |
| 4,165,494 | 8/1979 | Becker | 330/262 |
| 4,216,437 | 8/1980 | Sakaida | 330/263 |

*Primary Examiner*—Benedict V. Safourek

*Attorney, Agent, or Firm*—Fliesler, Dubb, Meyer & Lovejoy

[57] ABSTRACT

A method and apparatus for generating bipolar pulses in a local area network is disclosed comprising a transmitter. In the transmitter there is provided a pair of transistors which are coupled together in a resistor network. A capacitor is provided for coupling the transistors and resistor network to a transmission line. In operation, the output impedance of the transmitter is low when either of the transistors is conducting and high when neither of the transistors is conducting. To generate Alternate Mark Inversion pulses, both transistors are turned on. Thereafter, and in response to a signal corresponding to a logical 1, one of the transistors is turned off and then turned on for generating a positive pulse on the transmission line. Upon the occurrence of a subsequent control signal corresponding to the next logical 1, the other of the transistors is turned off and then on for producing a negative pulse on the transmission line. By alternately turning the transistors on and off upon the occurrence of control signals corresponding to each logical 1, Alternate Mark Inversion pulses are produced on the transmission line.

15 Claims, 4 Drawing Figures

METHOD AND APPARATUS FOR GENERATING BIPOLAR PULSES IN A LOCAL AREA NETWORK

BACKGROUND OF THE INVENTION

1. Field of the Invention

The present invention relates to a method and apparatus for generating pulses in general and to a method and apparatus for generating alternate bipolar pulses in a local area network in particular.

2. Description of Prior Art

A local area network, as its name implies, is a network of transmitting and receiving stations which are coupled together by means of a communications link within a relatively small area.

The transmitting and receiving stations may be combined, as they often are, in a single unit. When they are so combined, they are often called transceivers. The communications link which is used to couple the transceivers is usually a conventional coaxial transmission line. The transmission line typically used comprises a relatively low characteristic impedance, e.g. 50-100 ohms, and may be several kilometers long.

In a typical local area network, the transceivers are coupled in parallel to the transmission line at spaced points along the line. In networks in which the transceivers are used for coupling digital terminals, the transceivers comprise pulse transmitters and receivers for transmitting and receiving pulse streams corresponding to the data being transmitted between them.

Heretofore, one of the most common methods and apparatus used for coupling a pulse transmitter in a local area network has been a pulse transformer.

There are a number of disadvantages in using a pulse transformer in a local area network. Included among the disadvantages is the fact that a typical pulse transformer is relatively expensive. Another and very important disadvantage is the fact that a pulse transformer is a low impedance type device and, consequently, a transceiver which uses a pulse transformer to couple the transceiver to a local area network has a low output impedance at all times, both when transmitting and when not transmitting.

The fact that a pulse transmitter which uses a pulse transformer has low output impedance at all times places significant constraints on a local area network in which such transmitters are used. For example, the use of pulse transmitters having a low output impedance significantly affects the signal-to-noise ratio of signals on a line, particularly when a plurality of such transmitters are coupled to the same line. As more and more of such transmitters are coupled to the line, the signal-to-noise ratio drops until a point is reached whereat communications between transceivers becomes unreliable, particularly if they are widely separated. As a consequence, such transceivers are generally required to have a relatively high output power and sensitivity which in turn makes them expensive. Alternatively, the number of such transceivers which can be coupled in a single network must be severely restricted, which seriously restricts the usefulness of the network.

The type of pulses used in a local area network also affect the performance of the network. Heretofore, a common type of pulse transmitter which has been used in local area networks and other types of communication networks has been a unipolar pulse transmitter. A unipolar pulse transmitter is a type of transmitter which generates pulses which are either positive or negative with respect to a reference potential. For example, a positive unipolar pulse is a pulse which rises and falls between a reference potential, e.g. 0 volts, and a positive potential, e.g. +5 volts. A negative unipolar pulse is a pulse which rises and falls between a reference potential, e.g. 0 volts, and a negative potential, e.g. −5 volts.

A principal disadvantage of using unipolar pulse transmissions in a communications network is associated with a phenomena known as DC wander or DC drift. Most commonly, DC wander is manifested by pulses which drift, over time, from a predetermined reference potential.

To eliminate DC wander, it has become the practice to use in conventional digital telephone systems and local area networks other pulse generating techniques such as, for example, a ternary technique based on three coding scales. One such technique is the bipolar pulse generation technique known as Alternate Mark Inversion.

In Alternate Mark Inversion, also known as AMI, logical "1's" separated by one or more logical "0's" are represented by alternate positive and negative pulses. The intervening logical "0's" are represented by the absence of a pulse. For example, a typical AMI pulse stream representing logical 10101 comprises in sequence relative to a reference clock a positive pulse, no pulse, a negative pulse, no pulse and a positive pulse.

One of the principal features of a local area network is the ability of two or more transceivers to commence transmissions simultaneously. This is possible because the only connection between the transceivers is the data transmission line itself. There are no other interconnecting control lines. When two or more transceivers commence transmissions simultaneously, the data signals on the transmission line may conflict, i.e. collide, in such a manner that the signals intended for a particular receiver become garbled or are not detectable by the receiver. To prevent such transmissions from being irretrievably lost, various proposals have been made to detect the collision of data and retransmit the colliding data. Such proposals are commonly called data collision detection and correction methods and apparatus.

One proposal which has been made for data collision detection involves comparing a transmitted signal with a received signal. Since both the transmitter and receiver of each transceiver are coupled to the transmission line, any signal transmitted by a transceiver is received by the same transceiver. After a predetermined delay due to inherent circuit delays, the signals are compared. If there is no other signal on the line, there will be a predetermined correspondence between the signals. However, if another signal is on the line, the other signal will distort the transmitted signal and this correspondence will not be present. In the absence of the desired correspondence, the transmitter will terminate its transmissions and recommence its transmissions at a later time.

The lack of correspondence between the compared signals described above can also occur if there is a mismatched impedance on the line due to a short circuit, low impedance or other circuit condition which gives rise to a significant reflected signal. Since a reflected signal will obviously have a transit time in most cases which does not correspond to the inherent circuit delay described above, a reflected signal will appear to a transmitting transceiver as if another transceiver is also transmitting. This will cause the transmitting transceiver to terminate transmissions. For this reason, it has been the practice, heretofore, to match every component coupled to the transmission line to the characteristic impedance of the line. Needless to say, such matching is particularly difficult especially in a relatively high density network when pulse transformers are used to couple the transceivers to the transmission line.

SUMMARY OF THE INVENTION

For the foregoing and other reasons discussed herein, a principal object of the present invention is a pulse transmitter for use in a local area network which has, relative to the characteristic impedance of a line to which it is connected, a very low impedance when transmitting and a very high impedance when not transmitting.

Another object of the present invention is a pulse transmitter as described above which does not use a pulse transformer for coupling the transmitter to the transmission line.

Still another object of the present invention is a pulse transmitter as described above which generates Alternate Mark Inversion pulses.

In accordance with the above objects there is provided in a preferred embodiment of the present invention an Alternate Mark Inversion pulse transmitter. In the transmitter there is provided a pair of bipolar or field effect transistors. One of the transistors is coupled to a source of potential, e.g. +5 volts, and to the other transistor through a pair of series connected low valued resistors, e.g. 10 ohms. The latter transistor is also coupled to ground. The control electrodes of the transistors are coupled to a pair of signal sources. A pair of high valued resistors, e.g. one megohm, are coupled in series between the source of potential and ground. The nodes between the high and low valued resistors are coupled in common to one side of a capacitor. The opposite side of the capacitor is provided for coupling to a coaxial transmission line having a relatively low characteristic impedance, e.g. 50-100 ohms.

In operation, when either of the transistors is conducting, the output impedance of the transmitter is less than 10 ohms. When neither transistor is conducting, the output impedance is approximately 0.5 megohms. With a typical transmission line characteristic impedance of 50 to 100 ohms, it can be seen that when either of the transistors is conducting, the transmitter has a relatively low output impedance and when neither of the transistors is conducting, it has a relatively high output impedance.

The generation of Alternate Mark Inversion pulses using the transmitter of the present invention is accomplished by turning both of the transistors on and off in a predetermined sequence. For example, with both transistors on, turning the grounded transistor off and on produces a positive pulse, whereas turning the transistor connected to the potential source off and on produces a negative pulse. In either case, the magnitude of the positive and negative pulses is one half the magnitude of the potential source.

From the foregoing it can be seen that among the principal advantages of the present invention is the fact that bipolar pulses are generated using a single potential source; that, because a transmitting transceiver has a relatively low output impedance, collision detection is enhanced due to significantly larger reflected signals when two or more transceivers are transmitting; and that, due to a high output impedance when not transmitting, many transceivers can be safely connected to a single transmission line. Indeed, with the present invention, reliable communication between as many as 225 transceivers connected to a single transmission line one kilometer long can be achieved.

BRIEF DESCRIPTION OF THE DRAWING

The above and other objects, features and advantages of the present invention will become apparent from the following detailed description of the accompanying drawing in which.

DETAILED DESCRIPTION OF THE DRAWING

Figure 1:
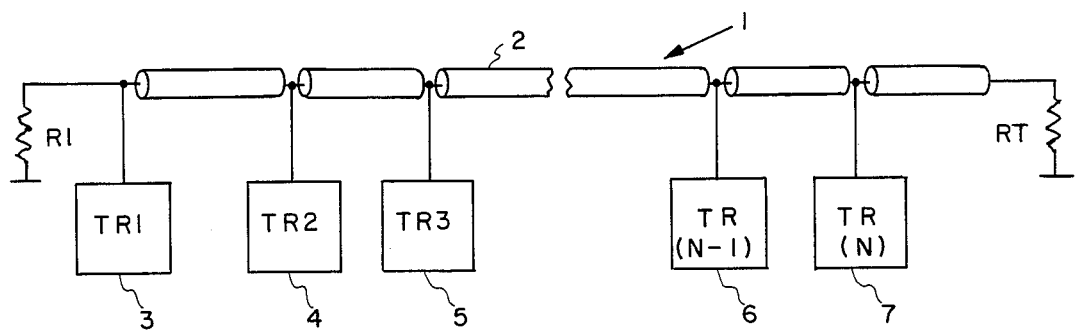
FIG. 1 is a block diagram of a local area network according to the present invention.

Referring to FIG. 1, there is provided in accordance with the present invention a local area network designated generally as 1. In the network 1 there is provided a conventional transmission line 2 such as a coaxial cable. The line 2 is terminated on each end by a terminating resistor RT. Coupled to the transmission line 2, there is provided a plurality of transceivers 3-7, also designated TR1, TR2, TR3, ... TR(n-1), TR(n).

The transmission line 2 has a characteristic impedance, e.g. 50-100 ohms. The magnitudes of the terminating resistors RT correspond to the characteristic impedance of the transmission line 2. The transceivers 3-7 are coupled to the transmission line 2 at selected locations along the line by conventional T-couplers.

The transmission line 2 may be 1 kilometer long and have coupled thereto as many as 225 transceivers according to the present invention.

Figure 2:
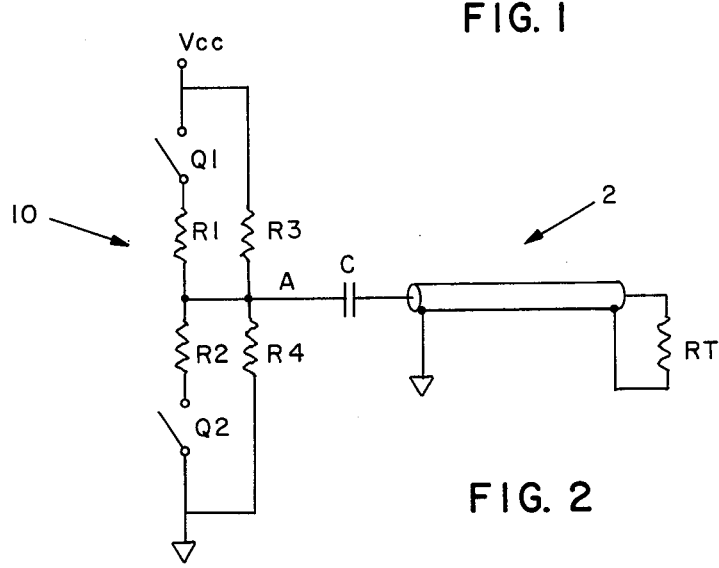
FIG. 2 is a generalized schematic of an embodiment of the present invention.

Referring to FIG. 2, there is shown a generalized schematic of the output stage of a pulse transmitter designated generally at 10 which is used in each of the transceivers 3-7 according to the present invention. In the transmitter 10 there is provided a pair of transistors which are represented by switches Q1 and Q2, a plurality of resistors R1-R4 and a capacitor C. One of the electrodes of the transistor Q1 is coupled to a source of potential $V_{CC}$, e.g. +5 volts. Another of the electrodes of the transistor Q1 is coupled to one of the electrodes of the transistor Q2 through the resistors R1 and R2 which are connected in series. Another of the electrodes of the transistor Q2 is coupled to ground. The resistors R3 and R4 are coupled in series between the source of potential $V_{CC}$ and ground. Between the resistors R1 and R2 and the resistors R3 and R4 there is provided a common node A which is connected to one side of the capacitor C. The opposite side of the capacitor C is provided for coupling the transmitter 10 to the transmission line 2, as described above with respect to FIG. 1. While only a single transmitter 10 is shown in FIG. 2, it is understood that each of the transceivers 3-7 will contain a pulse transmitter corresponding to the pulse transmitter 10 of FIG. 2.

Figure 3:
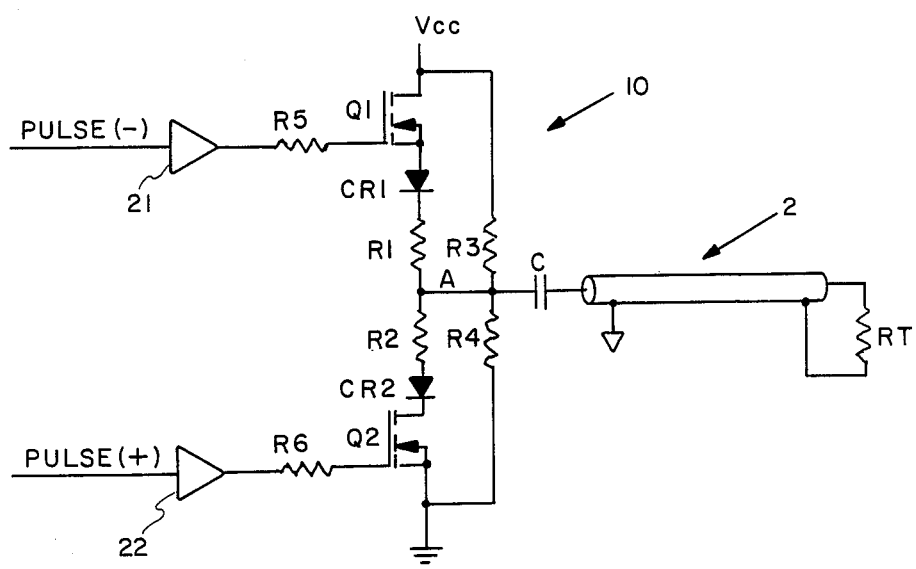
FIG. 3 is a schematic of a specific embodiment of the present invention.

Referring to FIG. 3, there is shown a specific embodiment of the transmitter 10 of FIG. 2 in which the transistors Q1 and Q2 comprise field effect transistors. The drain of the transistor Q1 is coupled to the source of potential $V_{CC}$. The source of the transistor Q1 is coupled to the drain of the transistor Q2 through a diode CR1, the resistor R1, a diode CR2 and resistor R2. The source of the transistor Q2 is coupled to ground. As in FIG. 2, the resistors R3 and R4 are coupled in series between the source of potential $V_{CC}$ and ground. A node A between the resistors R1 and R2 and the the resistors R3 and R4 is coupled to one side of the capacitor C. The diodes CR1 and CR2 reduce the coupling capacitance at node A caused by Q1 and Q2. The gate electrode of the transistor Q1 is coupled to a conventional negative pulse control buffer 21 through a resistor R5. The gate electrode of Q2 is coupled to a positive pulse control buffer 22 through a resistor R6. In a typical embodiment of the invention, transistors Q1 and Q2 comprise the transistors in a VQ1000 transistor package and diodes CR1 and CR2 comprise IN4454 diodes.

In practice, the values and R3 and R4 are substantially greater than the values of R1 and R2 such that the coupling of plural transmitters 10 in parallel to the transmission line 2 will not adversely affect the continuity of impedance along the line. The actual values of R3 and R4 depend on the number of transmitters 10 coupled in parallel to the line at any one time. The actual values of R1 and R2 depend on the power to be transmitted to the line.

Preferably, the magnitudes of R1 and R2 should be less than half of the magnitude of the characteristic impedance of the line and the magnitudes of R3 and R4 should be greater than twice the magnitude of the characteristic impedance of the line.

In each of the embodiments disclosed, a typical value for the resistors R1 and R2 is 10 ohms and a typical value for the resistors R3 and R4 is one megohm.

As will be appreciated from the foregoing description, the resistors R1–R4 form voltage dividers which determine the potential at node A and the potential on the transmission line 2 as transistors Q1 and Q2 are turned off and on. For example, ignoring the forward voltage drop and ON-state resistance of Q1, Q2, CRA and CR2, when Q1 and Q2 are both off, the potential $V_{CC}$ is equally divided across the resistors R3 and R4 causing the potential at node A to equal approximately $\frac{1}{2}V_{CC}$. When Q1 is on and Q2 is off, the potential $V_{CC}$ is divided across the parallel combination of the resistors R1 and R3 and the resistor R4 connected in series therewith. In this case, the output of the impedance of the transmitter is less than 10 ohms and the potential at node A is approximately equal to $V_{CC}$. When Q1 is turned off and Q2 is turned on, the potential $V_{CC}$ is divided across R3 and the parallel combination of the resistors R2 and R4 in series therewith. In this case, the output impedance of the transmitter is once again less than 10 ohms but the potential at node A is approximately 0 volts. When both transistors Q1 and Q2 are on, the potential $V_{CC}$ is equally divided across the resistors R1 and R2. In this case, the output impedance is approximately 5 ohms and the potential on node A is approximately $\frac{1}{2} V_{CC}$. As will be further described below with respect to FIG. 4, as the potential on node A varies between $V_{CC}$, $\frac{1}{2} V_{CC}$, and 0 volts, there is a corresponding change in the potential on the transmission line 2.

Figure 4:
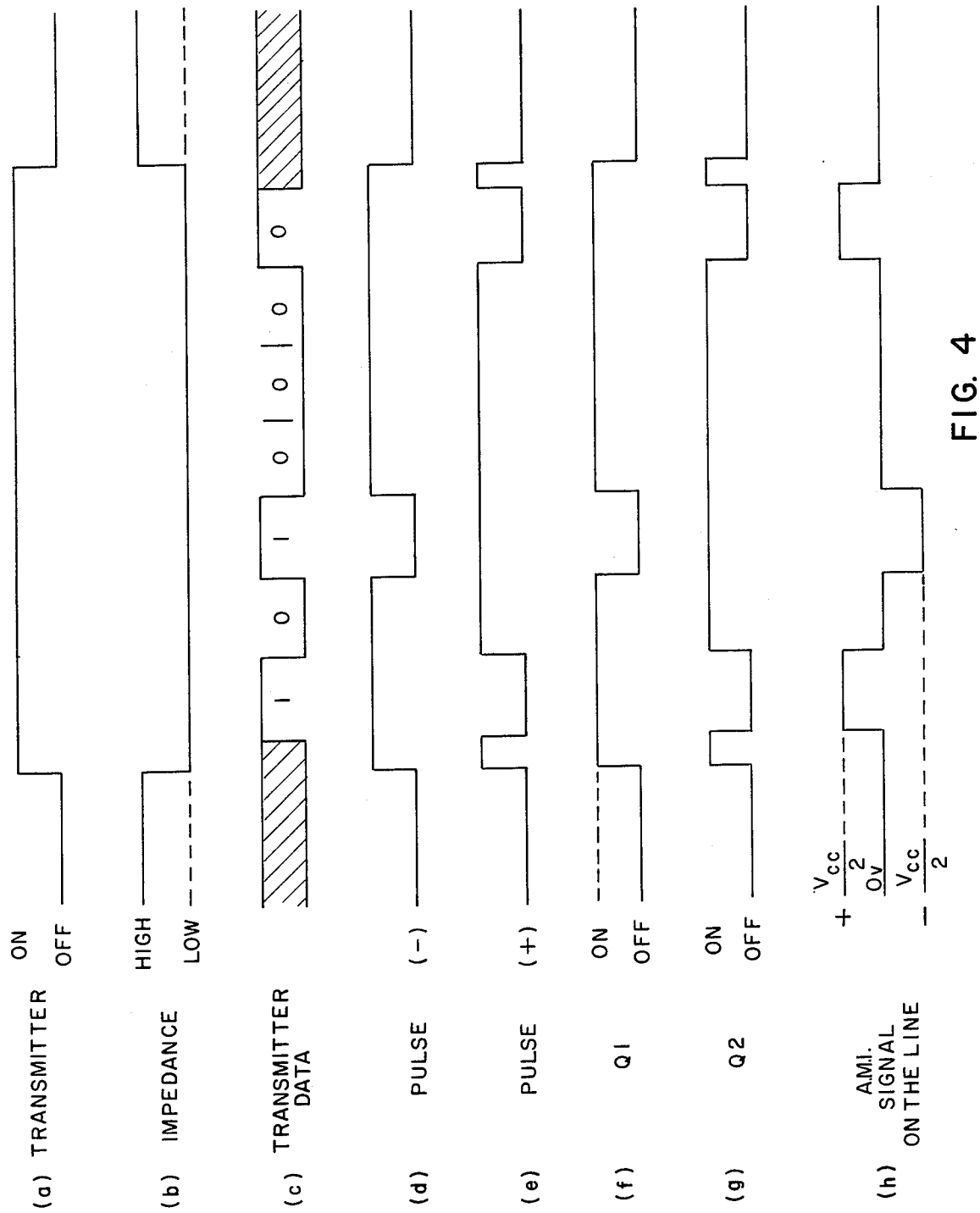
FIG. 4(a)-4(h) are timing diagrams of the embodiments of the present invention.

Referring to FIG. 4, there is provided a plurality of impedance and pulse diagrams (a)–(h) relating to the operation of the embodiments of FIGS. 2 and 3. In diagram (a) there is provided a representation of the transmitter when it is on and off. In diagram (b) there is a representation of the output impedance of the transmitter when it is on and off. In diagram (c) there is provided a representation of data pulses comprising a series of logical 1's and logical 0's which are applied to the transmitter for controlling the transistors Q1 and Q2. In diagrams (d) and (e) there is provided a representation of the control signals corresponding to the data of diagram (c) which is applied to the control electrodes of the transistors Q1 and Q2, respectively. In diagrams (f) and (g) there is provided a representation of the transistors Q1 and Q2 in their on and their off states. In diagram (h) there is provided a representation of the potentials on the transmission line 2 when the transistors Q1 and Q2 are turned on and off according to a predetermined sequence.

In operation, the transmitter of the present invention is operated to provide Alternate Mark Inversion pulses on the transmission line 2. This is accomplished by turning the transistors Q1 and Q2 on and off in a predetermined sequence.

To provide the Alternate Mark Inversion pulses, each transmission cycle starts and finishes with the transmitter having a low output impedance, i.e. with both Q1 and Q2 on. As shown in diagrams (f) and (g), with both Q1 and Q2 on, the potential at node A is equal to $+\frac{1}{2}V_{CC}$ and the potential on the transmission line 2, i.e. the drop across RT, is 0 volts. Upon the leading edge of the first logical 1, as shown by diagram (c), transistor Q2 is turned off. When transistor Q2 is turned off, the potential on node A rises from $+\frac{1}{2}V_{CC}$ to approximately $V_{CC}$. The resulting charging of the capacitor C and voltage drop across the terminating resistor RT produces a positive pulse on the transmission line 2 having a magnitude of $+\frac{1}{2}V_{CC}$ as shown in diagram (h). The length of the positive pulse is determined by the length of the control signals applied to the control electrodes of the transistors Q1 and Q2. On the trailing edge of the logical 1, as shown in diagram (c), Q2 is turned on again. Turning Q2 on reduces the potential at node A from $V_{CC}$ to approximately $\frac{1}{2}V_{CC}$. The change of potential on node A causes the capacitor C to discharge, resulting in the potential on the transmission line 2 to decrease from $+\frac{1}{2}V_{CC}$ to approximately 0 volts. Thereafter, both Q1 and Q2 remain on and the potential on the line 2 remains at 0 volts during the period of the following logical 0 as shown in diagrams (c) and (h).

On the leading edge of the next logical 1 pulse as shown in diagram (c), transistor Q1 is turned off while transistor Q2 is allowed to remain on as shown in diagrams (f) and (g). When transistor Q1 turns off, the potential at node A drops from $+\frac{1}{2}V_{CC}$ to 0 volts. The resulting discharging of the capacitor C due to the change of potential at node A causes a corresponding change in potential on the transmission line 2 from 0 volts to $-\frac{1}{2}V_{CC}$. This potential on the transmission line 2 remains until the end of the logical 1 as shown in diagram (c). On the trailing edge of the logical 1, as shown in diagram (c), the transistor Q1 is turned on again. With both transistors Q1 and Q2 on, the potential at node A rises from 0 volts to approximately $+\frac{1}{2}V_{CC}$. This increase in potential at node A results in a corresponding increase in potential on the transmission line 2 such that the potential on the transmission line 2 rises from $-\frac{1}{2}V_{CC}$ to 0 volts, as shown in diagram (h). The potential on the transmission line 2 remains at 0 volts over the period of the next three logical 0's as shown in diagrams (c) and (h). Upon the leading edge of the next logical 1 as shown in diagram (c), transistor Q2 is again turned off and the operation of the transmitter as described above with respect to the occurrence of the first logical 1 is repeated.

From the foregoing description of the operation of the transmitter of the present invention, it will be appreciated that the Alternate Mark Inversion pulses are generated using a single potential source with an amplitude equal to one half of the magnitude of the potential source and a width proportional to the width of the pulses presented through the buffers to the control electrodes of each transistor. For example, the switches Q1 and Q2 may comprise bipolar transistors instead of field effect transistors, the values of the resistors R1–R4 may be changed, and the like.

While a preferred embodiment of the present invention is disclosed and described, it is contemplated that various changes and modifications may be made thereto without departing from the spirit and scope of the present invention. It will also be appreciated that the high output impedance of the transmitter when it is not transmitting a logical 1 or logical 0, permits a large number of transceivers to be connected to a single network. Further, the low output impedance when the transmitter is transmitting enhances conventional data collision detection. Accordingly, it is intended that the scope of the invention be limited to the embodiments described but be determined by reference to the claims hereinafter provided.

What is claimed is:

1. A pulse transmitter comprising:
   a first switch means which is switchable between a conducting state and a non-conducting state and having a first electrode coupled to a source of potential;
   a second electrode coupled to a node through a first resistor having a first resistance;
   means responsive to a control signal for switching said first switch means between said conducting and non-conducting states;
   a second switch means which is switchable between a conducting state and a non-conducting state and having a first electrode coupled to said node through a second resistor having a second resistance;
   a second electrode coupled to a reference potential; and
   means responsive to a control signal for switching said second switch means between said conducting and non-conducting states;
   a third resistor having a third resistance coupled between said source of potential and said node;
   a fourth resistor having a fourth resistance coupled between said node and said reference potential, the magnitude of each of said third and said fourth resistances being substantially greater than the magnitude of each of said first and said second resistances; and
   a capacitor having a first electrode coupled to said node and a second electrode for coupling to a transmission line.

2. A transmitter according to claim 1 having an output impedance and wherein the magnitude of each of said first, said second, said third and said fourth resistances is such that when either of said first and said second switch means is in its conducting states, the magnitude of said output impedance is less than the magnitude of either of said first or said second resistances.

3. A transmitter according to claim 2 wherein the magnitudes of said first and said second resistances are substantially equal and the magnitudes of said third and said fourth resistances are substantially equal.

4. A transmitter according to claim 1 wherein the magnitude of each of said first and said second resistances is approximately 10 ohms and the magnitude of each of said third and said fourth resistances is approximately one megohm.

5. A transmitter according to claim 1 wherein each of said first and said second switch means comprises a field effect transistor and said switching means comprises a gate electrode.

6. A transmitter according to claim 1 wherein each of said first and said second switch means comprises a bipolar transistor and said switch means comprises a base electrode.

7. A transmitter according to claim 1 wherein the magnitudes of said first, said second, said third and said fourth resistances are such that, when said transmitter is in its ON-state, the output impedance of said transmitter is substantially less than the characteristic impedance of said transmission for enhancing collision detection and, when said transmitter is in its OFF-state, the output impedance of said transmitter is substantially greater than the characteristic impedance of said transmission line to prevent adversely affecting the continuity of impedance along the line.

8. A transmitter according to claim 7 wherein the magnitudes of said first and said second resistances are less than half of the magnitude of the characteristic impedance of said transmission line and the magnitudes of said third and said fourth resistances are greater than twice the magnitude of the characteristic impedance of said transmission line.

9. A method of generating a pair of bipolar pulses on a transmission line using a pulse transmitter comprising a first switch means which is switchable between a conducting state and a non-conducting state and having a first electrode coupled to a source of potential; a second electrode coupled to a node through a first resistor having a first resistance; means responsive to a control signal for switching said first switch means between said conducting and non-conducting states; a second switch means which is switchable between a conducting state and a non-conducting state and having a first electrode coupled to said node through a second resistor having a second resistance; a second electrode coupled to a reference potential; means responsive to a control signal for switching said second switch means between said conducting and non-conducting states; a third resistor having a third resistance coupled between said source of potential and said node; a fourth resistor having a fourth resistance coupled between said node and said reference potential, the magnitude of each of said third and said fourth resistances being substantially greater, than the magnitude of each of said first and said second resistances; and a capacitor having a first electrode coupled to said node and a second electrode for coupling to a transmission line, comprising the steps of:
   switching said first and said second switch means to their conducting state; then, after a first predetermined period,
   switching one of said first and said second switch means to its nonconducting state; then, after a second predetermined period, switching said one of said switch means to its conducting state; then, after a third predetermined period, switching the other of said switch means to its nonconducting state; and then, after a fourth predetermined period, switching said other of said switching means to its conducting state.

10. A method according to claim 9 wherein said second predetermined period comprises the period of one of said pair of bipolar pulses, said fourth predetermined period comprises the period of the other of said pair of bipolar pulses.

11. A method according to claim 10 wherein the period of each of said bipolar pulses corresponds to the period of an integral number of binary ONES and the period between said bipolar pulses corresponds to the period of an integral number of binary ZEROS.

12. a method according to claim 9 comprising the step of generating a series of said bipolar pulses wherein a bipolar pulse having a magnitude of one polarity is followed by a bipolar pulse having a magnitude of the opposite polarity.

13. A method according to claim 12 wherein the absolute magnitudes of each of said pulses is approximately one-half the magnitude of said potential source.

14. A method according to claim 9 wherein the magnitudes of said first, said second, said third and said fourth resistances are such that, when said transmitter is in its ON-state, the output impedance of said transmitter is substantially less than the characteristic impedance of said transmission for enhancing collision detection and, when said transmitter is in its OFF-state, the output impedance of said transmitter is substantially greater than the characteristic impedance of said transmission line to prevent adversely affecting the continuity of impedance along the line.

15. A method according to claim 14 wherein the magnitudes of said first and said second resistances are less than half of the magnitude of the characteristic impedance of said transmission line and the magnitudes of said third and said fourth resistances are greater than twice the magnitude of the characteristic impedance of said transmission line.

* * * * *

UNITED STATES PATENT AND TRADEMARK OFFICE
CERTIFICATE OF CORRECTION

PATENT NO. : 4,620,310
DATED : October 28, 1986
INVENTOR(S) : LAZAR LVOVSKY et al It is certified that error appears in the above-identified patent and that said Letters Patent is hereby corrected as shown below:

Column 5, line 39, "CRA" should be --CR1--.

Column 7, line 25, after "invention" insert --not--.

Column 9, line 22, "a" should be --A--.

Signed and Sealed this

Seventeenth Day of March, 1987

Attest:

DONALD J. QUIGG

*Attesting Officer*　　　*Commissioner of Patents and Trademarks*